(12) United States Patent
Blayvas et al.

(10) Patent No.: US 9,191,578 B2
(45) Date of Patent: Nov. 17, 2015

(54) ENHANCED IMAGE PROCESSING WITH LENS MOTION

(75) Inventors: Ilya Blayvas, Ramat Gan (IL); Noam Sorek, Zichron Yacoov (IL); Ilia Vitsnudel, Even Yehoda (IL)

(73) Assignee: Broadcom Corporation, Irvine, CA (US)

( * ) Notice: Subject to any disclaimer, the term of this patent is extended or adjusted under 35 U.S.C. 154(b) by 617 days.

(21) Appl. No.: 13/538,029

(22) Filed: Jun. 29, 2012

(65) Prior Publication Data

US 2014/0002606 A1 Jan. 2, 2014

(51) Int. Cl.
*H04N 13/02* (2006.01)
*H04N 5/225* (2006.01)
*H04N 5/235* (2006.01)
*G02B 27/00* (2006.01)
*G02B 7/38* (2006.01)
*H04N 5/232* (2006.01)

(52) U.S. Cl.
CPC ............... *H04N 5/2356* (2013.01); *G02B 7/38* (2013.01); *G02B 27/0075* (2013.01); *H04N 13/0271* (2013.01); *H04N 5/23212* (2013.01); *H04N 13/0221* (2013.01)

(58) Field of Classification Search
None
See application file for complete search history.

(56) References Cited

U.S. PATENT DOCUMENTS

| 8,605,202 | B2 * | 12/2013 | Muijs et al. ............ 348/345 |
| 2006/0291844 | A1 * | 12/2006 | Kakkori ................. 396/89 |
| 2008/0013941 | A1 * | 1/2008 | Daley .................... 396/121 |
| 2009/0167930 | A1 * | 7/2009 | Safaee-Rad et al. ......... 348/347 |
| 2009/0244300 | A1 * | 10/2009 | Levin et al. ............. 348/208.5 |
| 2011/0292364 | A1 * | 12/2011 | Kawamura ............... 355/55 |
| 2012/0075424 | A1 | 3/2012 | Kawamoto et al. |
| 2012/0200673 | A1 * | 8/2012 | Tagawa et al. ........... 348/46 |
| 2012/0281132 | A1 * | 11/2012 | Ogura et al. ............ 348/348 |

FOREIGN PATENT DOCUMENTS

| TW | M321664 | | 11/2007 | |
| TW | 201005416 A | | 2/2010 | |
| WO | WO2012/104759 | * | 1/2012 | ............ H04N 13/02 |

OTHER PUBLICATIONS

"Flexible Depth of Field Photography," Kuthirummal, et al., as published in IEEE Transactions on Pattern Analysis and Machine Intelligence, vol. 33, No. 1 (Jan. 2011).*
"Half-Sweep Imaging for Depth from Defocus", Matsui, et al, Springer-Verlag Berlin Heidelberg (2011).*
"Flexible Depth of Field Photography", Nagahara, et al. (2008).*
Zhou, C., Lin, S., and Nayar, S., "Coded Aperture Pairs for Depth from Defocus", 2009 IEEE 12th International Conference on Computer Vision (2009).*

* cited by examiner

*Primary Examiner* — William C Vaughn, Jr.
*Assistant Examiner* — Lindsay Uhl
(74) *Attorney, Agent, or Firm* — McDermott Will & Emery LLP

(57) ABSTRACT

An exemplary imaging system operates by capturing image information as a lens moves within a defined focal length range during image exposure, where a focused image having an extended depth of field can be generated by using a profile of lens motion in processing the image.

20 Claims, 13 Drawing Sheets

ENHANCED IMAGE PROCESSING WITH LENS MOTION

BACKGROUND

When taking pictures, a photographer controls the focus distance by using various lenses or by adjusting the shutter size and/or lens distance from the point in the camera that records the picture. The focus distance is the distance from the camera in which objects are maximally focused relative to the rest of the picture. Around the focus distance is an area which is essentially focused at least above a certain threshold level. The picture can be adjusted to have certain areas focused and certain areas blurred. For example, an object at a specific distance can be focused with objects at other distances blurred. Alternatively, the picture can be focused from a specific distance, up to a specific distance, or between two distances. Typically, the focused area with a reasonable level of clarity is referred to as the depth of field.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

This disclosure pertains to various devices, methods, computer useable media, and processors programmed to utilize camera lens motion during frame exposure for image processing and/or determining optimal image focus settings. As one possible example, image information captured during lens movement over a defined range may be used to extract a focused image having an extended depth of field as part of an image processing pipeline in a digital camera, digital video camera, or other imaging device. Additionally, the image processing pipeline can extract autofocus information and/or generate a distance map (or depth map) from the captured image information, where different profiles of lens motion may be used during exposure of a single frame or adjacent frames. One of ordinary skill in the art would recognize that the techniques disclosed may also be applied to other contexts and applications as well. For cameras in embedded devices, e.g., digital cameras, digital video cameras, mobile phones, personal data assistants (PDAs), tablets, portable music players, and desktop or laptop computers, techniques such as those disclosed herein can improve image quality.

To acquire image data, a digital imaging device may include an image sensor that provides a number of light-detecting elements (e.g., photodetectors) configured to convert light detected by the image sensor into an electrical signal. An image sensor may also include a color filter array that filters light captured by the image sensor to capture color information. The image data captured by the image sensor may then be processed by an image processing pipeline circuitry, which may apply a number of various image processing operations to the image data to generate a full color image or sequence of video frames that may be displayed for viewing on a display device or screen.

Figure 1:
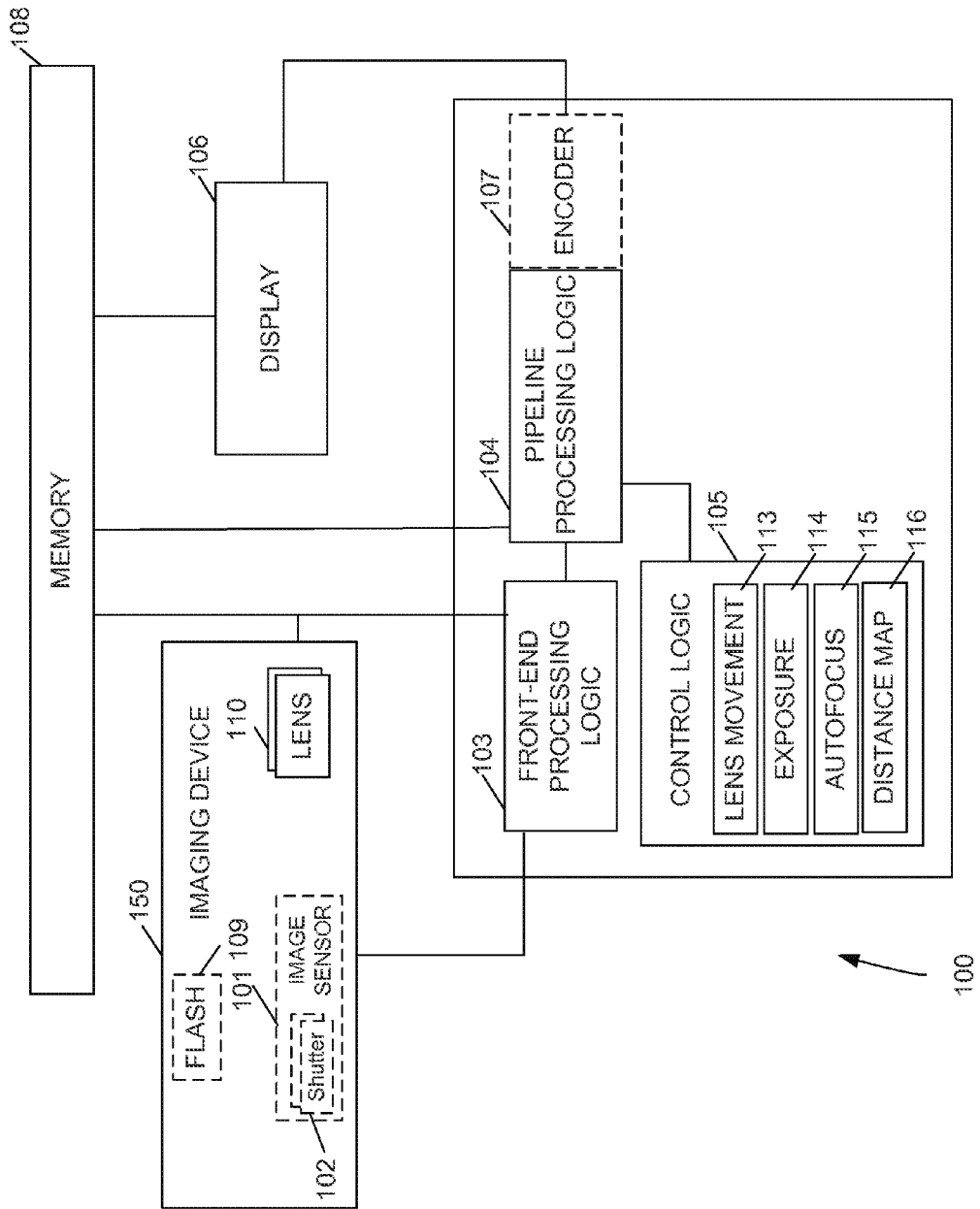
FIG. 1 is a block diagram of an exemplary embodiment of an image processing circuitry for an imaging device in accordance with the present disclosure.

Referring to FIG. 1, a block diagram of one embodiment of an image processing circuitry 100 is shown for an image capture or imaging device 150. The illustrated imaging device 150 may be equipped with a digital camera configured to acquire both still images and moving images (e.g., video). The device 150 may include lens(es) 110 and one or more image sensors 101 configured to capture and convert light into electrical signals. By way of example only, the image sensor may include a CMOS (complementary metal-oxide-semiconductor) image sensor (e.g., a CMOS active-pixel sensor (APS)) or a CCD (charge-coupled device) sensor.

A flash light source (e.g., a light emitting diode) 109 may also be provided near the lens 110 to aid in providing light in a dark environment, in some embodiments. If the imaging device 150 detects that ambient light is insufficiently bright to properly expose a picture, the imaging device 150 enables the flash 109 and the picture is taken.

In some embodiments, the image processing circuitry 100 may include various subcomponents and/or discrete units of logic or circuitry that collectively form an image processing "pipeline" for performing each of the various image processing steps. These subcomponents may be implemented using hardware (e.g., digital signal processors or ASICs (application-specific integrated circuits)) or software, or via a combination of hardware and software components. The various image processing operations may be provided by the image processing circuitry 100.

The image processing circuitry 100 may include front-end processing logic or circuitry 103, pipeline processing logic or circuitry 104, and control logic or circuitry 105, among others. The image sensor(s) 101 may include a color filter array (e.g., a Bayer filter) and may thus provide both light intensity and wavelength information captured by each imaging pixel of the image sensors 101 to provide for a set of raw image data that may be processed by the front-end processing logic 103.

In some embodiments, a single lens 110 and a single image sensor 101 may be employed in the image processing circuitry. While in other embodiments, multiple lens 110 and multiple image sensors 101 may be employed. In one embodiment, an image sensor 101 operates an electronic shutter 102 for each pixel cell. Accordingly, an electronic shutter 102 of a pixel cell may allow each cell to receive and integrate input light with an individual time of start and end.

Further, embodiments of an imaging device 150 may have modes of operation such that one mode may allow for the imaging device 150 to generate an image with extended depth of field; a second mode may allow for the imaging device 150 to generate a distance map, a third mode may allow the imaging device 150 to determine an autofocus setting, etc. Embodiments of the imaging device 150 may employ modes of operation that are selectable from interface elements of the device. Interface elements may include graphical interface elements selectable from a display 106 or mechanical buttons or switches selectable or switchable from a housing of the imaging device 150 or application program interface for control from other programs and or applications.

The front-end processing logic 103 may also receive pixel data from memory 108. For instance, the raw pixel data may be sent to memory 108 from the image sensor 101. The raw pixel data residing in the memory 108 may then be provided to the front-end processing logic 103 for processing.

Upon receiving the raw image data (from image sensor 101 or from memory 108), the front-end processing logic 103 may perform one or more image processing operations. The processed image data may then be provided to the pipeline processing logic 104 for additional processing prior to being displayed (e.g., on display device 106), or may be sent to the memory 108. The pipeline processing logic 104 receives the "front-end" processed data, either directly from the front-end processing logic 103 or from memory 108, and may provide for additional processing of the image data in the raw domain, as well as in the RGB and YCbCr color spaces, as the case may be. Image data processed by the pipeline processing logic 104 may then be output to the display 106 (or viewfinder) for viewing by a user and/or may be further processed by a graphics engine. Additionally, output from the pipeline processing logic 105 may be sent to memory 108 and the display 106 may read the image data from memory 108. Further, in some implementations, the pipeline processing logic 104 may also include an encoder 107, such as a compression engine, for encoding the image data prior to being read by the display 106, prior to storing in memory 108, or prior to transferring over a network.

The encoder 107 may be a JPEG (Joint Photographic Experts Group) compression engine for encoding still images, an H.264 compression engine for encoding video images, or another kind of encoder for still images or video. Also, it should be noted that the pipeline processing logic 104 may also receive raw image data from the memory 108.

The control logic 105 may include a processor and/or microcontroller configured to execute one or more routines (e.g., firmware) that may be configured to determine control parameters for the imaging device 150, as well as control parameters for the pipeline processing logic 104. By way of example only, the control parameters may include sensor control parameters, camera flash control parameters, lens control parameters (e.g., position of lens groups for focusing or zoom, exposure lengths or durations, focal sweep ranges, etc.), shutter control parameters, or a combination of such parameters for the image sensor(s) 101. The control parameters may also include image processing commands, such as auto-white balance, autofocus, autoexposure, extended depth of field, distance map, lens position, shutter controls, stereoscopic, and color adjustments for the pipeline processing logic 104. The control parameters may further comprise multiplexing signals or commands for the pipeline processing logic 104. Implementation of control parameters and logic may be activated based on activation of certain modes of operation.

Control logic 105 may further include lens movement logic or circuitry 113. Embodiments of the lens movement logic 113 control movement of lens 110 in accordance to user commands and/or processor commands. Various techniques may be employed by the processor to implement lens movement. One technique involves moving the lens 110 during an exposure of a single frame from a minimum focal position to a maximum focal position. In another embodiment, the range of motion may be a subrange that falls within a focal sweep range between the minimum focal position and the maximum focal position. Accordingly, in various embodiments, the lens 110 is moved during an exposure integration of a single image frame within a certain subrange of focal positions corresponding to a subrange of distances to objects in focus in order to increase image quality, distance map resolution, or other resulting advantages.

Figure 2:
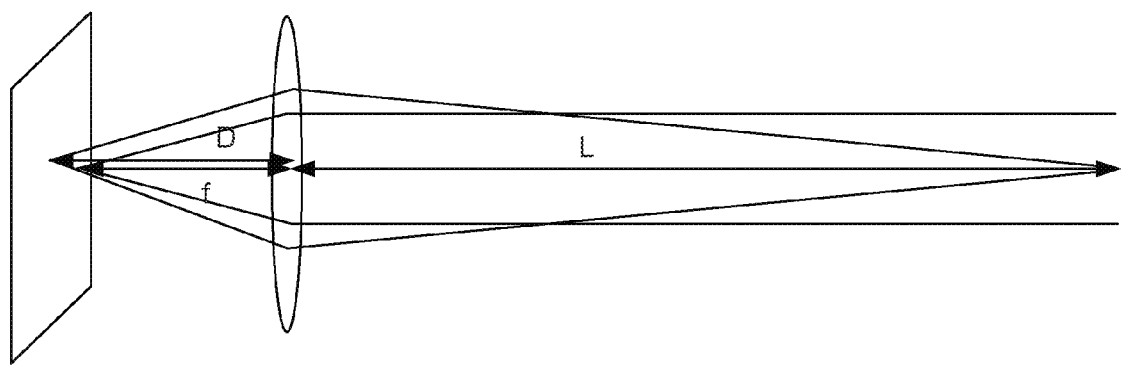
FIG. 2 is a diagram illustrating the relationship between the lens focal length, focal distance, and the distance from the lens to the object in focus for an imaging device in accordance with the present disclosure.

FIG. 2 is a diagram illustrating the relationship between the lens focal length f, the distance from the lens to the image sensor (later called focal distance) D, and the distance from the lens to the object in focus L. The thin lens equation connects these distances as:

$$\frac{1}{f} = \frac{1}{L} + \frac{1}{D}. \qquad (1)$$

From (1), one can obtain the equation for the distance to the object in focus:

$$L = \frac{1}{\frac{1}{f} - \frac{1}{D}}. \qquad (2)$$

For example, if the focal length of the lens f=20 mm, and the focal distance is D=20 mm, the lens is focused to infinity, which means the remote objects will be the sharpest (most focused) on the image.

TABLE 1

| D (mm) | 20 | 20.1 | 20.2 | 20.3 | 20.4 | 20.5 | 20.6 | 20.7 | 20.8 | 20.9 | 21 |
|---|---|---|---|---|---|---|---|---|---|---|---|
| L (M) | Infinity | 4M | 2M | 1.35M | 1M | 0.82M | 0.69M | 0.59M | 0.52M | 0.46M | 0.42M |

Table 1 includes example distances from the lens to the image plane (in millimeters) and corresponding distance to the sharp object in the scene (in meters) for lens with focal length f=20 mm. Table 1 is given as illustration only, and the actual data for real lenses will be different and vary with different lens focal lengths and types. Table 1 indicates, that in order to sweep the distance to the objects in focus from 0.42M to infinity, the lens position must be swept from 21 mm to 20 mm; while in order to sweep the distance to the objects in focus from 1M to 2M, the lens position must be swept from 20.4 mm to 20.2 mm.

The speed at which the lens 110 is moved during the sweep may be a uniform speed or may be varied in various embodiments. Also, for an adjacent frame, the lens 110 may be moved in an opposite direction and/or moved at an inverse rate of speed as compared to the movement of the lens for a previous frame. This means that while in the first sweep, the lens was moving slow at the beginning of the focus range, and fast at the end of the focus range; and, at the second sweep, the lens will move slow at the end of the focus range and fast at the beginning of the range. Accordingly, image information or data captured for a frame as the lens 110 is moving necessarily includes image information that is focused at any given scene distance from the full lens range, (or range predefined by lens motion). Thus, the obtained image will contain the focused image of all the objects at arbitrarily different distances. However, the obtained image will also contained the defocused component, since for any object distance the lens during the exposure was also at the positions corresponding to defocused image. By deconvolving the captured image information with a blur kernel corresponding to the motion profile of the lens 110 during the frame exposure, an image can be generated with an extended depth of field.

For embodiments where the lens 110 moves, an actuator or other mechanism may be used that receives signals from the lens movement logic 113 and causes the lens 110 to move or shift in and/or out. Another possible technique used by the imaging device is to control activating a shutter of the image sensor 101 via exposure logic or circuitry 114, including synchronizing activation of individual pixel shutters with movement of the lens 110. The individual pixel shutters can be activated during a time interval corresponding to the lens position for specific range of distances or from a previously determined distance map corresponding to the lens position when each individual pixel is in-focus. In one embodiment, autofocus logic or circuitry 115 generates focus data regarding the image and adjusts focus of the lens 110 based on the focus data via a motor, actuator, or other mechanism that moves the lens 110 in response to a command. Further, in one embodiment, distance map logic or circuitry 116 generates a distance map based on captured image data using lens motion.

As mentioned previously, imaging device 150 may have different modes of operation that cause implementation of particular device logic and/or imaging device parameters or settings. In one mode, images are generated having an extended depth of focus using lens motion during a single frame exposure. In one technique, the camera lens 110 is moved from a predefined position corresponding to the minimal focused distance to a position corresponding to the maximal focused distance during a single frame exposure. This allows for image information to be captured having focused image information for any distance from the predefined range. In other words, all of the objects in the scene is in focus at some point within the focal sweep range traveled by the lens and is contained within the captured image information. Therefore, the captured image information contains both focused and blurred information for pixel data captured throughout the focal sweep. Correspondingly, in one embodiment, during post processing by the pipeline processing logic 104, the captured image undergoes a deconvolution process allowing the focused image information to be extracted from the blurred part of the captured image information.

In one embodiment, a change of lens movement speed during the frame exposure allows favoring focal lengths that are presumed to be in-focus. Accordingly, rate of movement of the lens 110 may be slowed during a focal sweep subrange that is considered or presumed to correspond to focused captured image information and may be increased during a focal sweep subrange that is presumed to correspond to defocused or blurred captured image information. Similarly, under one mode of operation, particular focal lengths (or lens focal positions) may be of greater interest than other focal lengths in capturing an image. For example, in capturing a portrait of a subject, the foreground of the image containing the subject may be of interest, while the background of the image may not be of interest. Correspondingly, a sweep of focal lengths corresponding to the foreground may occur at a slower rate of speed than the focal lengths corresponding to the background information. Therefore, a greater amount of image information may be obtained for segments of interest.

Further, under one mode of operation, extended depth of field processing may be performed for a focal region or range of interest. Instead of sweeping the lens 110 during a full focal sweep range, the lens may be swept or moved within a subset or limited focal sweep range that is of interest, where the interested range may be set by the user or may be presumed in accordance with a camera setting. For example, in the context of taking a portrait image, the focal sweep range needed for foreground area in the scene may be used and the range needed for the background area in the scene may be chosen to not be included in the focal sweep.

Then, during post-processing of image information captured during movement of the lens 110 during a focal sweep over a defined range of focal lengths (or lens focal positions), imaging device parameters may include predesigned motion profiles or blur kernels corresponding to the distances and speed of the focal sweep used during the image exposure.

In one mode of operation, the pipeline processing logic 104 generates a two-dimensional (2D) or monoscopic image having an extended depth of field using lens motion during exposure of an image frame. In an alternative mode, the pipeline processing logic 104 may generate a distance map using lens motion during exposure of an image frame or a series of image frames. In particular, one embodiment of the pipeline processing logic 104 generates the distance map by considering captured image information from adjacent frames during movement of the lens. Pipeline processing logic 104 may use the distance map and a captured image to generate a stereoscopic image, in some embodiments.

Figure 3:
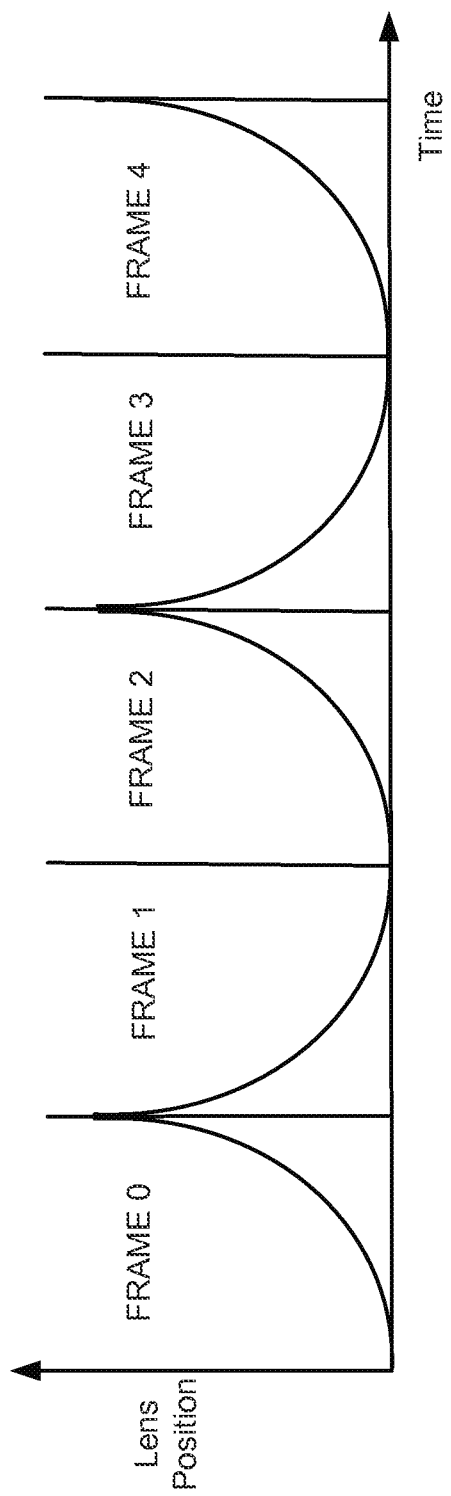
FIGS. 3-4 are diagrams of graphical charts showing rates of movement of an imaging lens over time during a series of exposures of image frames in accordance with embodiments of the present disclosure.

In one technique, speed of a focal sweep is changed from slow at the beginning of the sweep to fast at the end of the sweep, as depicted in FIG. 3. In particular, FIG. 3 is a diagram of graphical charts showing a rate of movement of the lens 110 over time during a series of exposures of image frames (Frame 0, Frame 1, Frame 2, and so on), in one embodiment. In FIG. 3, the first chart represents the rate of movement of the lens during exposure of a first frame (Frame 0) and the second chart represents the movement of the lens (in an opposite direction) for a second and adjacent frame exposure (Frame 1). As shown in the figure, a speed profile of the lens motion used in a focal sweep for Frame 0 is symmetric with respect to a speed profile of the lens motion used in a focal sweep for Frame 1.

Image information captured from the two exposures allows evaluation the depth of each pixel from the relative energy of sharp image information to the blurred image information captured during the adjacent exposures. Lower relative energy of the sharp part of the captured image information corresponds to faster speed of the lens 110, while higher relative energy corresponds to slower speed of the lens 110. As a result, a distance map of an image scene can be extracted, since for every pixel of the image, the lens 110 passed through its sharpest focus position, and this sharpest focus position can be evaluated from relative energy of the sharp contents to the blurred contents, and from the motion profile of the lens 110. Therefore, in a distance map, the focus image information obtained in post-processing can be positioned at appropriate depths based on the analysis of image information from adjacent frame exposures.

In one embodiment, a point spread function at each focal distance of the forward lens movement and the backward lens movement may be predetermined and calibrated in advance. Further, in one embodiment, the blur kernel or point spread function to be used during deconvolution may be constructed from the generated distance map. By analyzing the distance map of a scene and identifying regions in focus over blurry regions, explicit construction of an inverse blur kernel for the scene may be performed, as understood by one of skill in the art. Correspondingly, the constructed blur kernel may be used in deconvolution to extract the sharp image from the blurred image in subsequent image captures. This process of explicit deconvolution can provide improved results and improved images as compared to using blind deconvolution techniques.

As an example, during processing, some objects in a scene may be determined to be in focus in a first image, obtained with the slower lens motion in the region of focus to infinity, and not in focus or blurry in a second adjacent image, obtained with the faster lens motion in the region corresponding to the focus on infinity. Therefore, these objects may be determined to be placed at a focal distance of infinity on the distance map. However, if objects in the scene are determined to have similar clarity in both of the images, then these objects may be determined to be at an intermediate focal distance. Correspondingly, if objects are clear or sharp in the second image, obtained with slow lens motion during focus on near objects, frame but blurry in the first image frame, obtained with the fast lens motion during focusing on near objects, then these objects may be determined to be at a close focal distance with respect to the imaging device 150. Accordingly, from the two frames and by analyzing each pixel of a sub-region of a scene captured on both frames, the pipeline processing logic 104 can evaluate the distance to a sub-region or object from the imaging device 150. This determined distance can be used to position objects in a distance map and/or used for autofocusing of subsequent image captures.

Figure 4:
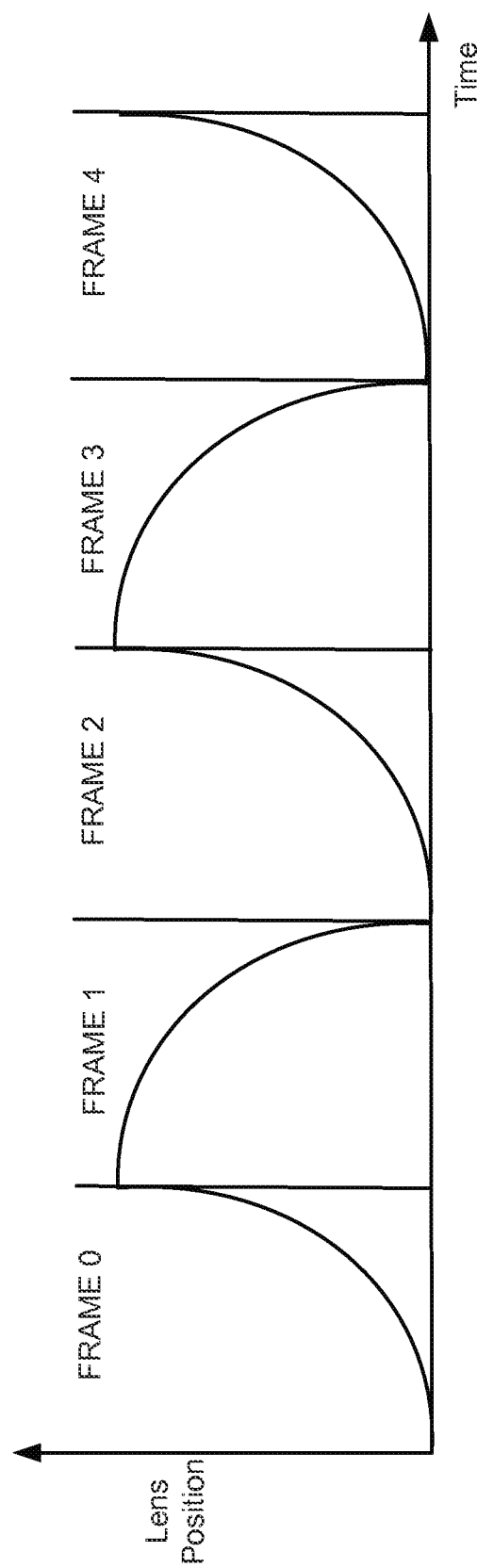

In one embodiment, pipeline processing logic 104 in addition to generating the distance map that defines a depth of each pixel in an image, also generates a stereoscopic image with pixels in the stereoscopic image being offset in accordance with the distance map. Therefore, the distance map may be used to convert a 2D image to a 3D image. Further, in one embodiment, asymmetric speed profiles for lens movement may also be utilized to calculate focus settings. As depicted in FIG. 4, in order to increase the accuracy of focus setting calculation from the image information, the depicted asymmetric profile of lens motion can be applied, where a speed profile of lens motion used in a first focal sweep is different with respect to a speed profile of lens motion used in a second focal sweep. In particular, FIG. 4 is a diagram of graphical charts showing a rate of movement of the lens 110 over time during a series of exposures of image frames (Frame 0, Frame 1, Frame 2, and so on), in one embodiment.

Consider adjacent Frames 0 and 1. In Frame 0, the lens 110 is moving slow at the beginning of the focal sweep (lower part of 'lens position' axis), and is moving fast at the end of the sweep. In Frame 1, the lens is moving at an inverse rate of speed, where the lens is moving slow at the end of the focal sweep (higher part of the 'lens position' axis) and is moving fast at the beginning of the focal sweep. Thus, if a particular pixel happens to be more sharp in Frame 0, and less sharp in Frame 1, the pixel corresponds to the beginning of the focal sweep (since it had more integration time in Frame 0 and less in Frame 1), and vice versa. Exact profiling, calculation, and calibration of the lens motion and measurement of the relative energy in the sharp and blurred parts of every pixel of the adjacent frames allows for calculating the exact depth position of the sharp focus for every pixel and generating a distance map calculation in real time. In particular, corrected image information may be obtained via deconvolution for either of the adjacent frames using the profiles for the respective lens motion used during exposure of the frame.

In addition to using lens motion to generate distance maps, lens motion may also be used to obtain information critical to an autofocus operation. From the foregoing discussion of the lens motion represented in FIG. 4, exact profiling, calculation, and calibration of the lens motion and measurement of the relative energy in the sharp and blurred parts of every pixel of the adjacent frames allows for calculating the exact focal length during the sharp focus for every pixel. Accordingly, the calculated focal length setting of the sharp focus can be used to position a lens 110 at an optimal focal length for subsequent image capture, when optical focusing of an image is preferred as opposed to improving image quality using post-processing.

In a different mode of operation, autofocus parameters may also be obtained after analysis of lens motions represented in FIG. 4 and analysis of neighboring image captures. In general, the range of the lens motion converges towards the focal length corresponding to the focused image. In certain embodiments, the lens position corresponding to the focused image can be identified after two captured frames.

In one mode of operation, autofocusing may be performed by analyzing the generated distance map and by controlling shutter actions per pixel. Therefore, by analyzing the distance map of a scene, the lens 110 may be moved within the focal sweep, and by having a discriminative electronic shutter 102 for each pixel, exposure of each pixel is triggered or opened at the appropriate time, when the focal length corresponds to the focused position of the pixel. Accordingly, set focal lengths that are to be used with particular pixels may be stored in memory 108.

In a different mode of operation, electronic shutters 102 may be synchronized with the focal sweep. For example, in a scene, the distance to scene object may change with the image row of pixels in the image sensor 101. As such, the lower lines of the image may correspond to closer objects in a scene, while the higher lines correspond to the more distant objects in the scene. This is due to the natural perspective of the image taken with the ground or floor in the lower side of the scene. In this mode of operation, in one embodiment, the shutters 102 may be rolling shutters that finish exposure of the first lines of the image earlier than exposure of the last lines of the image is completed. Therefore, by synchronizing the focal sweep with the shutters 102, the proper lens position for each image line is in focus.

Figure 5A:
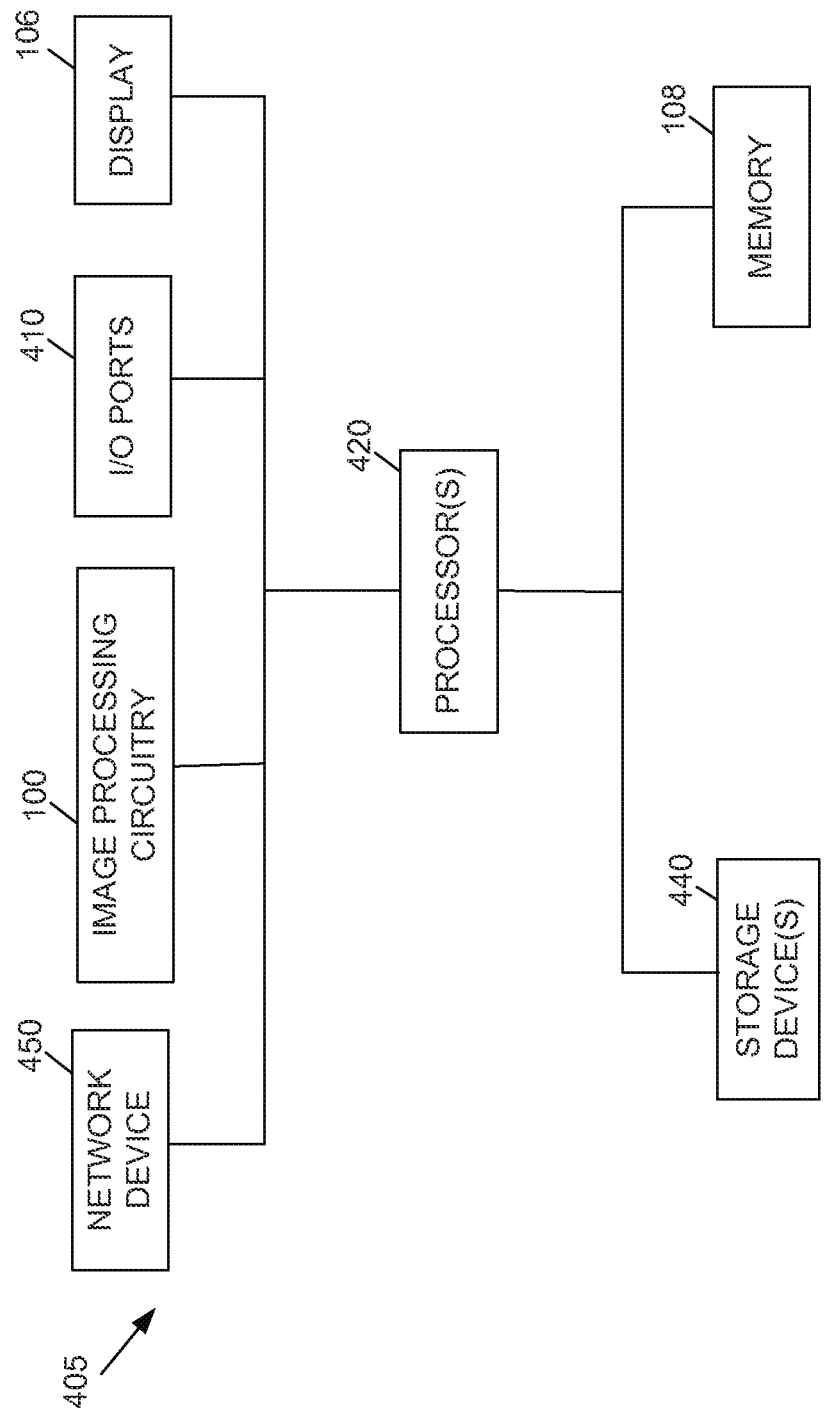
FIGS. 5A-5E are block diagrams illustrating exemplary electronic devices that provide for the processing of image data in accordance with embodiments of the present disclosure.

Keeping the above points in mind, FIG. 5A is a block diagram illustrating an example of an electronic device 405 that may provide for the processing of image data using one or more of the image processing techniques briefly mentioned above. The electronic device 405 may be any type of electronic device, such as a laptop or desktop computer, a mobile phone, tablet, a digital media player, or the like, that is configured to receive and process image data, such as data acquired using one or more image sensing components.

Regardless of its form (e.g., portable or non-portable), it should be understood that the electronic device 405 may provide for the processing of image data using one or more of the image processing techniques briefly discussed above, among others. In some embodiments, the electronic device 405 may apply such image processing techniques to image data stored in a memory of the electronic device 405. In further embodiments, the electronic device 405 may include one or more imaging devices 150, such as an integrated or external digital camera, configured to acquire image data, which may then be processed by the electronic device 405 using one or more of the above-mentioned image processing techniques.

As shown in FIG. 5A, the electronic device 405 may include various internal and/or external components which contribute to the function of the device 405. Those of ordinary skill in the art will appreciate that the various functional blocks shown in FIG. 5A may comprise hardware elements (including circuitry), software elements (including software code stored on a computer-readable medium), or a combination of both hardware and software elements.

In the presently illustrated embodiment, the electronic device 405 may include input/output (I/O) ports 410, one or more processors or microcontrollers 420, memory device 108, non-volatile storage 440, networking device 450, power source (e.g., battery), and display 106. Additionally, the electronic device 405 may include one or more imaging devices 150, such as a digital camera, and image processing circuitry 100 including processing pipeline 104 and encoder 107. As will be discussed further below, the image processing circuitry 100 may be configured to implement one or more of the above-discussed image processing techniques when processing image data. As can be appreciated, image data processed by image processing circuitry 100 may be retrieved from the memory 108 and/or the non-volatile storage device(s) 440, or may be acquired using the imaging device 150.

Before continuing, it should be understood that the system block diagram of the device 405 shown in FIG. 5A is intended to be a high-level control diagram depicting various components that may be included in such a device 405. That is, the connection lines between each individual component shown in FIG. 5A may not necessarily represent paths or directions through which data flows or is transmitted between various components of the device 405. Indeed, as discussed below, the depicted processor(s) 420 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU). Additionally, the processor(s) may execute routines adapted to control movement of the lens 110 via a lens movement logic 113, control operation of aperture and/or shutters 102 via exposure logic 114, determine autofocus settings via autofocusing logic 115, and generate distance maps via distance map logic 116, among others.

Figure 5B:
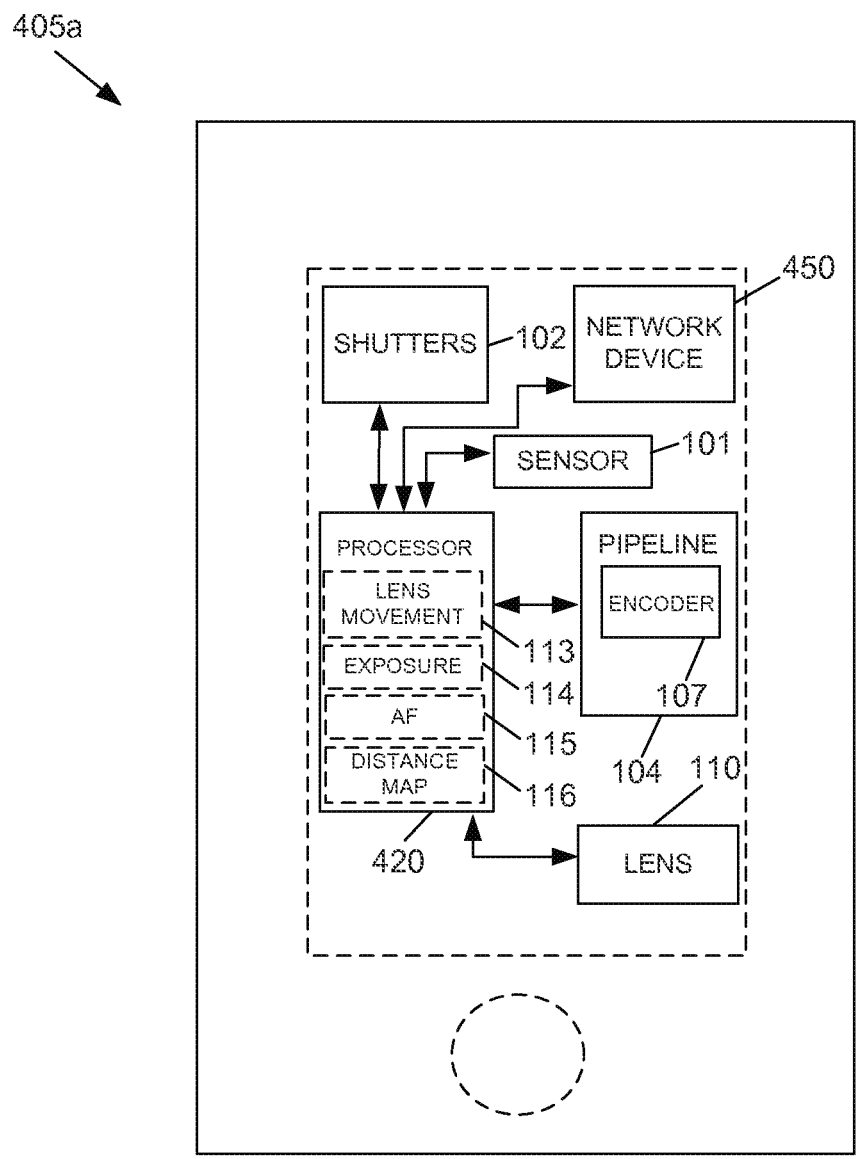

Electronic device 405 may comprise a variety of platforms in various embodiments. To illustrate, a smart phone electronic device 405a is represented in FIG. 5B, where the smart phone 405a includes at least one imaging device or sensor 101, processing pipeline 104 (e.g., extended depth of field processing, autofocusing processing, distance map processing, stereoscopic imaging processing, etc.), at least one encoder 107, electronic shutter component(s) 102, a power source, and network device 450, among other components (e.g., display, processor 420, etc.). The smart phone 405a may transmit wireless signals to or receives wireless signals from at least one of a base station, an external terminal, and a server through a mobile communication network via the network device 450.

Figure 5C:
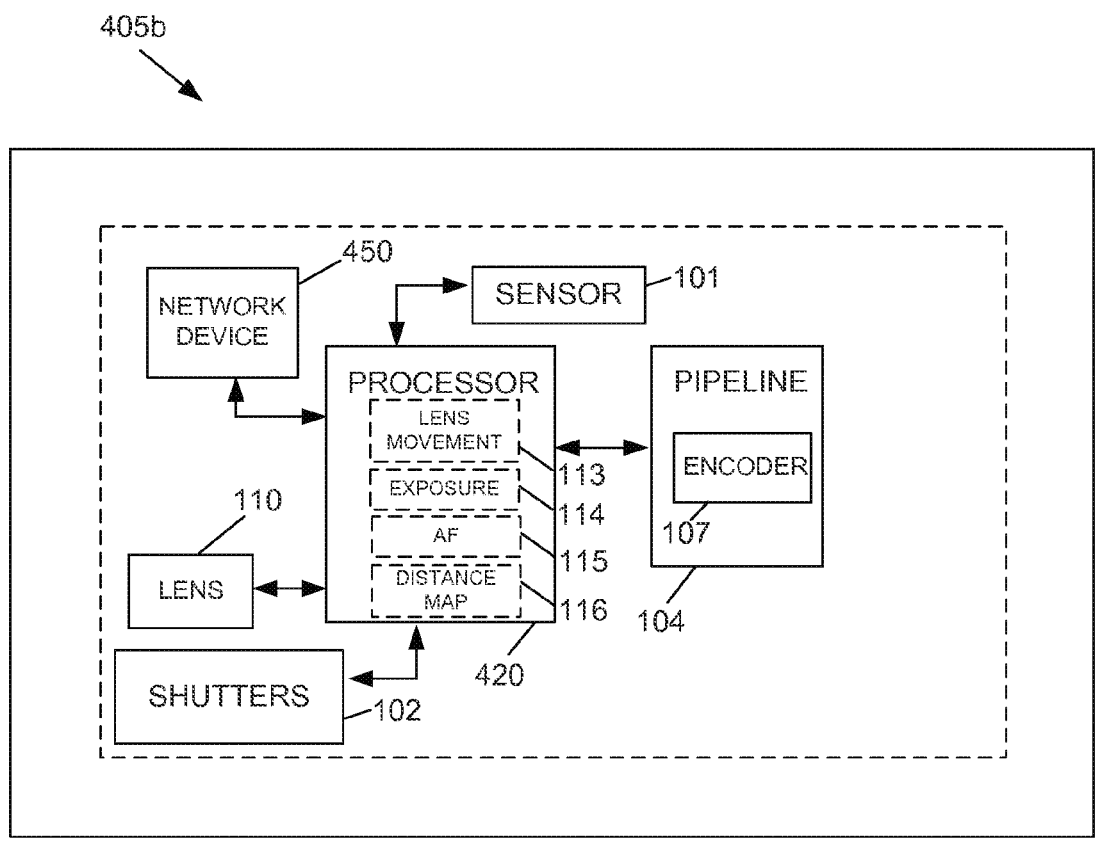
Figure 5D:
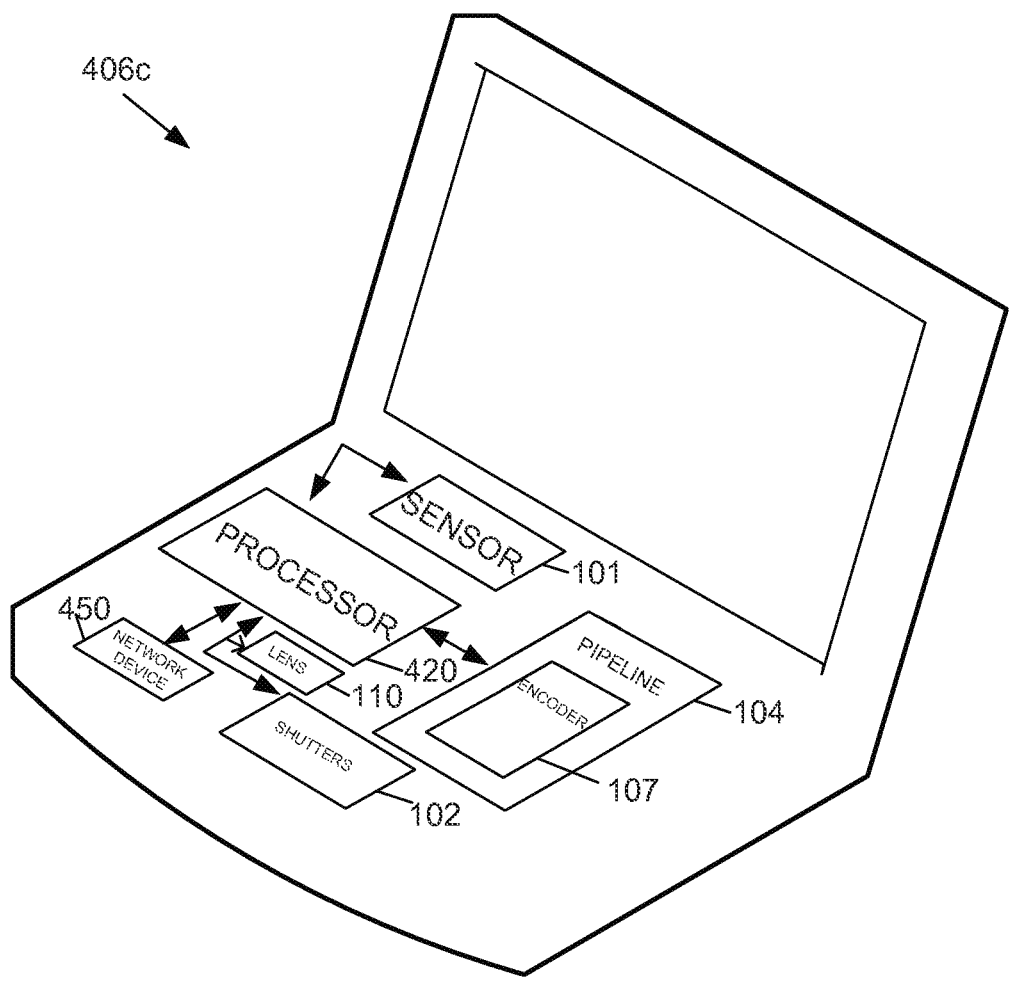

Further, a tablet electronic device 405b is represented in FIG. 5C, where the tablet 405b includes at least one imaging device or sensor 101, at least one encoder 107, a power source, and network device 450, among other components (e.g., display, processor 420, etc.). Then, a laptop computer 406c is represented in FIG. 5D, where the laptop computer 406c includes at least one imaging device or sensor 101, at least one lens 110, shutters 102, at least one encoder 107, among other components (e.g., display, processor 420, etc.). In particular, the processor 420 may include lens movement logic 113, exposure logic 114, autofocusing (AF) logic 115, distance map logic 116, in various embodiments.

Figure 5E:
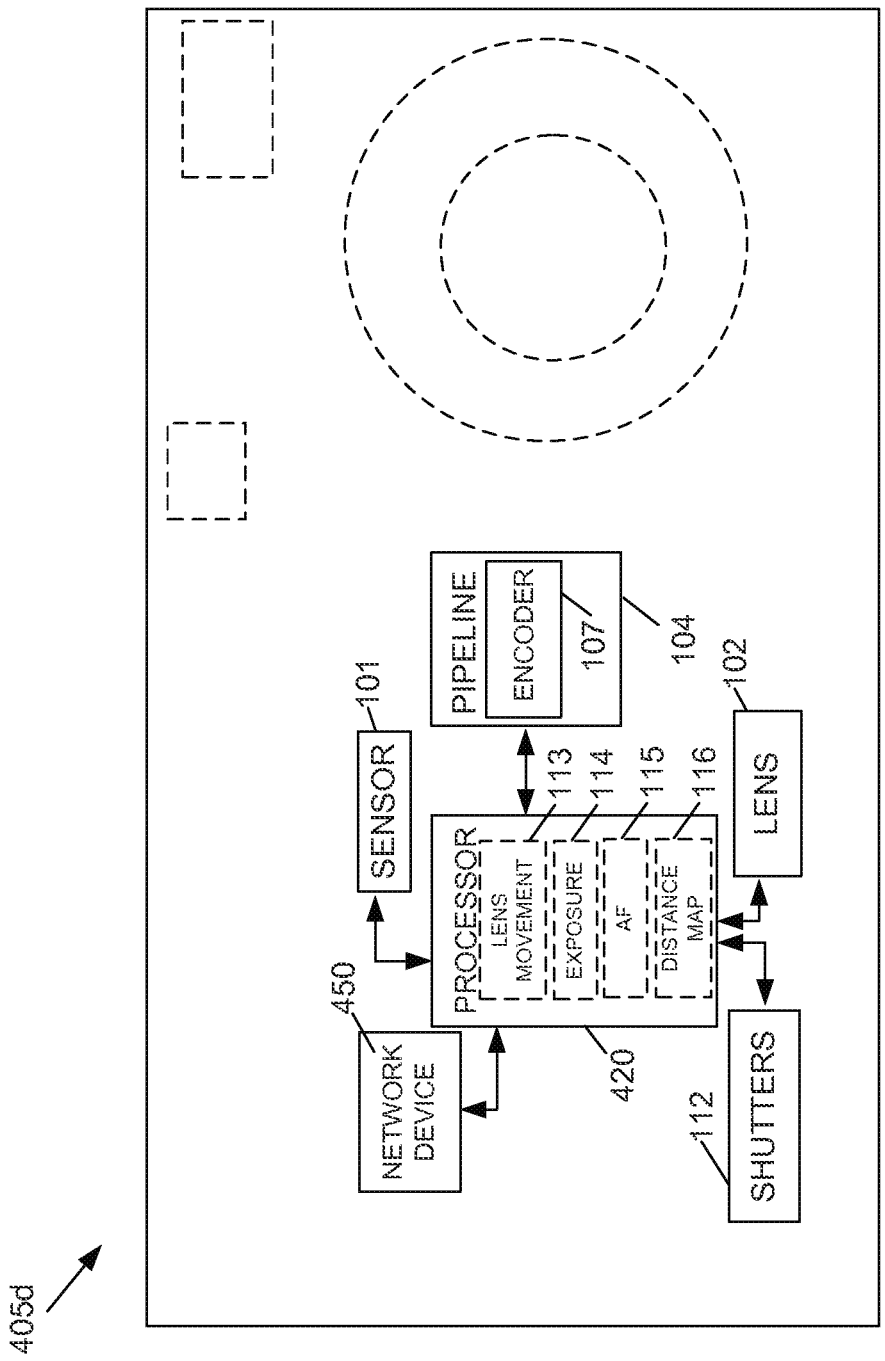

Also, a digital camera electronic device 405d is represented in FIG. 5E, where the digital camera 405d includes at least one imaging device or sensor 101, processing pipeline 104 (e.g., extended depth of field processing, autofocusing processing, distance map processing, stereoscopic imaging processing, etc.), at least one encoder 107, electronic shutter component(s) 102, a power source, and network device 450, among other components (e.g., display, processor 420, etc.). Therefore, a variety of platforms of electronic devices may be integrated with the encoder 107 and motion control component 282 of the various embodiments.

Figure 6:
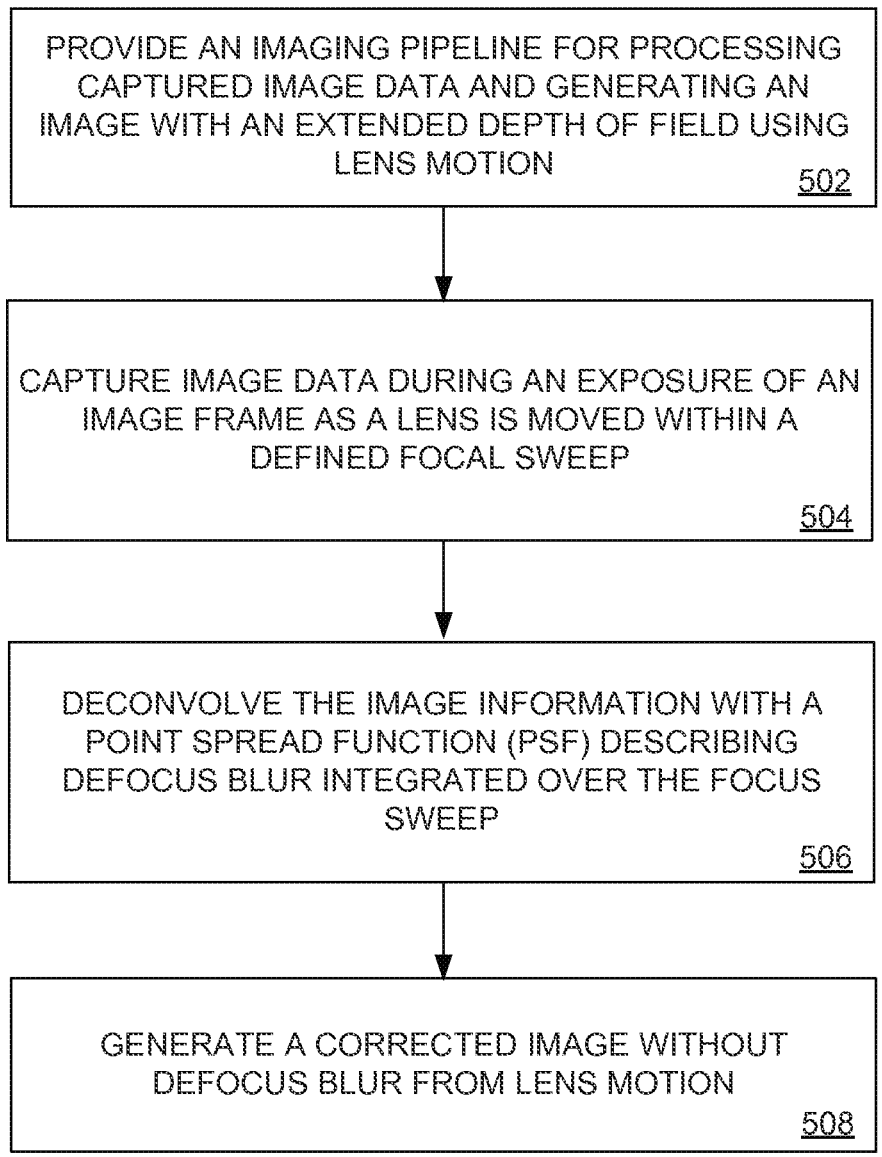
FIGS. 6-9 are flowcharts describing various embodiments of image processing methods in accordance with the present disclosure.

Referring next to FIG. 6, shown is a flowchart that provides one example of the operation of a portion of the image processing circuitry 100 according to various embodiments. It is understood that the flowchart of FIG. 6 provides merely an example of the many different types of functional arrangements that may be employed to implement the operation of the portion of the image processing circuitry 100 as described herein. As an alternative, the flowchart of FIG. 6 may be viewed as depicting an example of actions or parts of a method implemented in the electronic device 405 according to one or more embodiments.

Beginning with action 502, imaging processing circuitry 100 of an imaging device 150 provides an imaging pipeline for processing captured image data and generating an image with an extended depth of field using lens motion. As described for action 504, image data is captured during an exposure of an image frame as a lens 110 is moved within a defined focal sweep. The imaging processing circuitry 100 accesses a lens motion profile corresponding to a point spread function or blur kernel characterizing the lens motion used during the exposure. The lens motion may be uniform or may vary in speed along the range in which the lens is in motion, in various embodiments. Also, in some embodiments, the sweep of focus lengths may be configurable or adjustable. After capturing of image information for the single frame, the image information is deconvolved with a point spread function (PSF) describing the defocus blur integrated over the range of focus lengths used during the exposure, as depicted for action 506. Therefore, after the PSF is deconvolved with the captured image data, a corrected image is generated without defocus blur(s) or defocused image depth positions, for action 508.

Figure 7:
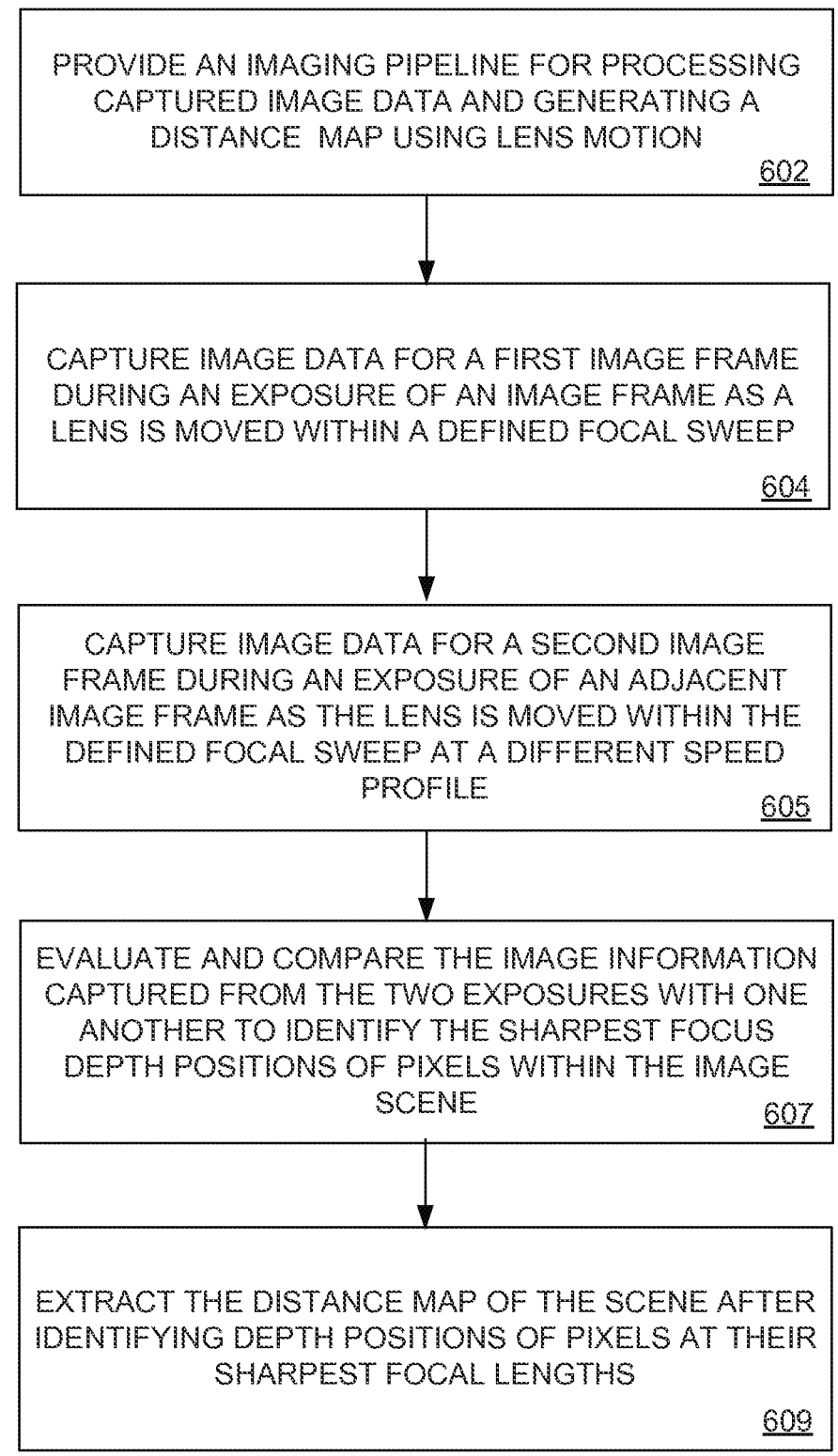

Referring next to FIG. 7, shown is a flowchart that provides one example of the operation of a portion of the image processing circuitry 100 according to various embodiments. Beginning with action 602, imaging processing circuitry 100 of an imaging device 150 provides an imaging pipeline for processing captured image data and generating a distance map using lens motion. As described with action 604, image data is captured for a first image frame during an exposure of an image frame as a lens 110 is moved within a defined focal sweep. Correspondingly, for action 605, image data is captured for a second image frame during an exposure of an adjacent image frame as the lens 110 is moved within the defined focal sweep at a different speed profile. Image information captured from the two exposures is evaluated and compared with one another to identify (607) the sharpest focus depth positions of pixels within the image scene. Then, the distance map of the scene is extracted (609) or generated after identifying depth positions of pixels at their sharpest focal lengths or lens focal positions.

Figure 8:
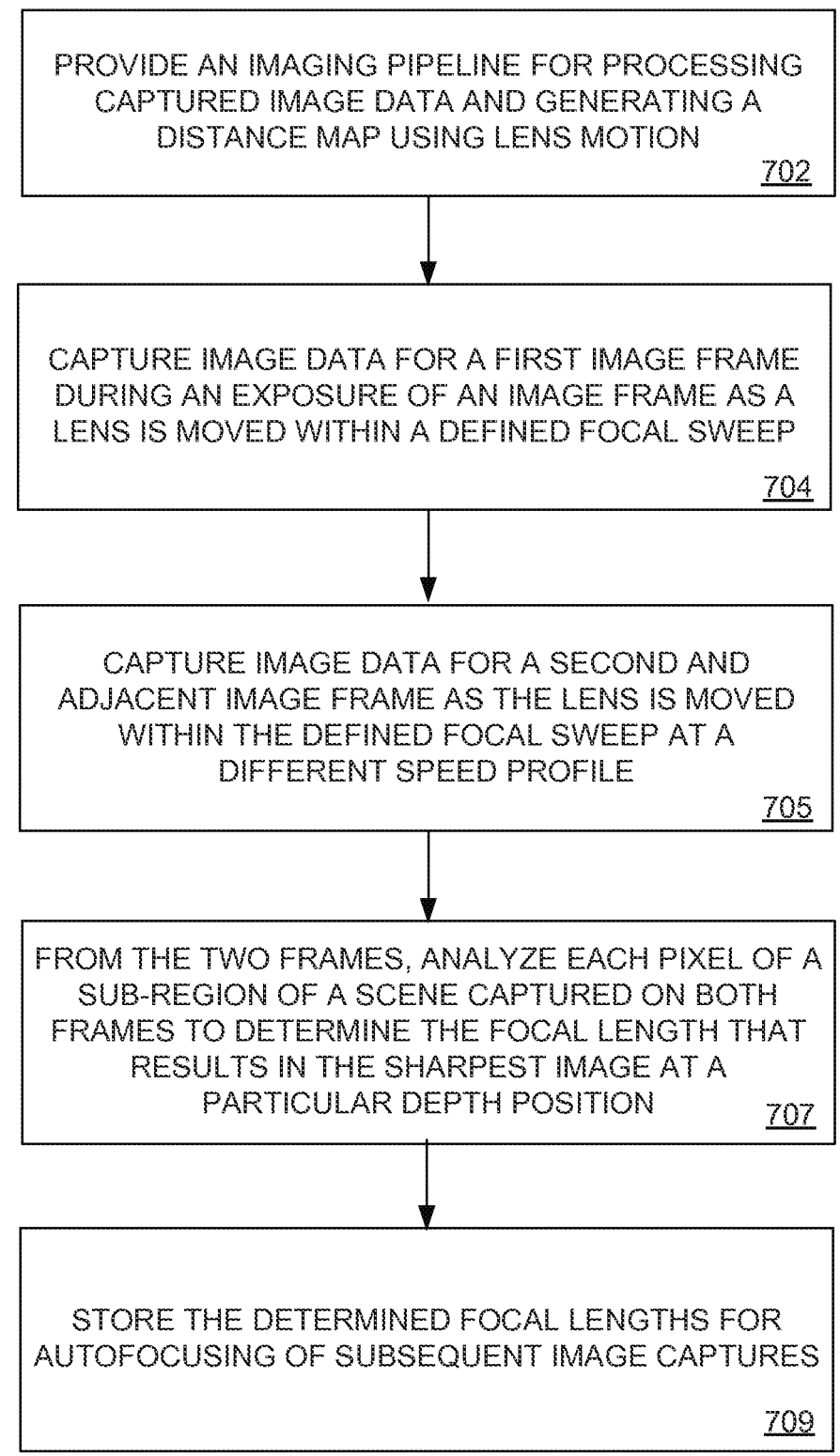

FIG. 8 shows a flowchart that provides one example of the operation of a portion of the image processing circuitry 100 according to various embodiments. Beginning with action 702, imaging processing circuitry 100 of an imaging device 150 provides an imaging pipeline for processing captured image data and generating autofocus settings or parameters using lens motion. As described with action 704, image data is captured for a first image frame during an exposure of an image frame as a lens 110 is moved within a defined focal sweep. Correspondingly, with action 705, image data is captured for a second and adjacent image frame as the lens 110 is moved within the defined focal sweep at a different speed profile. From the two frames, each pixel of a sub-region of a scene captured on both frames is analyzed by the pipeline processing logic 104 to determine (707) the focal length (or lens focal position) that results in the sharpest image at a particular depth position. This determined focal length is then stored (709) as autofocus settings or parameters for autofocusing of subsequent image captures.

Figure 9:
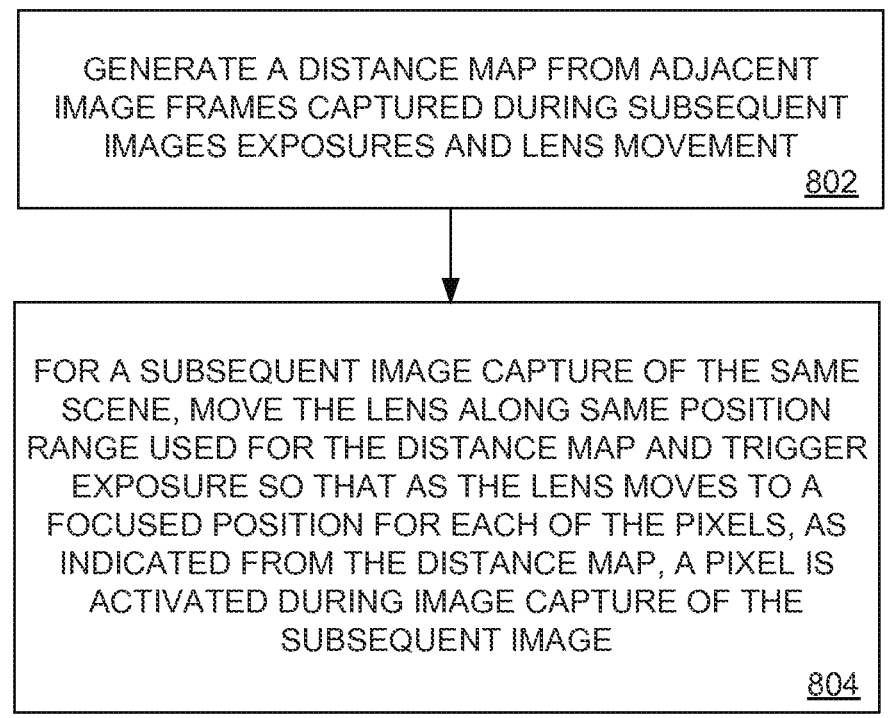

Next, FIG. 9 shows a flowchart that provides one example of the operation of a portion of the image processing circuitry 100 according to various embodiments. Beginning with action 802, imaging processing circuitry 100 of an imaging device 150 generates a distance map from adjacent image frames captured during subsequent images exposures and lens movement within a focal sweep. For a subsequent image capture of the same scene, the lens 110 is moved along same position range used for the distance map, so that as the lens 110 moves to a focused position for each of the pixels, as indicated from the distance map, exposure of the pixel is activated or opened (804) during image capture of the subsequent image.

Any process descriptions or blocks in flow charts should be understood as representing modules, segments, or portions of code which include one or more executable instructions for implementing specific logical functions or steps in the process, and alternate implementations are included within the scope of embodiments of the present disclosure in which functions may be executed out of order from that shown or discussed, including substantially concurrently or in reverse order, depending on the functionality involved, as would be understood by those reasonably skilled in the art.

Certain embodiments of the present disclosure can be implemented in hardware, software, firmware, or a combination thereof. An exemplary embodiment is implemented in software or firmware that is stored in a memory and that is executed by a suitable instruction execution system. If implemented in hardware, an alternative embodiment can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, flash or other solid state memory, a random access memory (RAM) (electronic), a read-only memory (ROM) (electronic), an erasable programmable read-only memory (EPROM) (electronic), an optical fiber (optical), and a portable compact disc read-only memory (CDROM) (optical). In addition, the scope of certain embodiments includes embodying the functionality of the embodiments in logic embodied in hardware or software-configured mediums.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described the invention, at least the following is claimed:

1. An imaging system comprising:
an imaging lens that is adjustable to different focal lengths;
an image sensor comprising a plurality of shutters and configured to receive image information from the imaging lens;
a mechanical mechanism to change a lens focal position during duration of a single image frame exposure of the image sensor; and
at least one hardware processing circuit configured to:
obtain a distance map of a scene from at least a first and second image captured by the image sensor while changing the lens focal position during an exposure of the first and second images, the lens focal position being changed with a first speed profile for the first image and a second speed profile for the second image, wherein the first and second speed profiles are asymmetric and associated with non-constant acceleration;
analyze the obtained distance map to identify first regions of the scene that are in focus and second regions of the scene that are out of focus;
construct a point spread function based at least on analyzing the obtained distance map;
capture a third image during a single image frame exposure of the image sensor by activating one or more of the plurality of shutters of the image sensor based on the distance map, the third image being captured subsequent to the first and second images; and
deconvolve the third image using the constructed point spread function to obtain an in-focus image.

2. The imaging system of claim 1, wherein for the first, the lens focal position is continually changed at a first varying rate of speed during the exposure of the first image, wherein for the second image, the lens focal position is continually changed at a different varying rate of speed in an opposite direction during the exposure of the second image.

3. The imaging system of claim 1, wherein each of the plurality of shutters is associated with a pixel of the image sensor, wherein each of the plurality of shutters is synchronized with the changing lens focal position of the imaging lens and is activated at a set lens focal position for a particular pixel to produce an in-focus capture of pixel data.

4. The imaging system of claim 1, wherein the at least one hardware processing circuit is further configured to determine an autofocus setting to be used to capture a subsequent image scene at a particular distance from the imaging system to an object by capturing two image frames comprising a fourth image and a fifth image, wherein for the fourth image, the lens focal position is continually changed at a first varying rate of speed during exposure of the fourth image, wherein for the fifth image, the lens focal position is continually changed at a different varying rate of speed during exposure of the fifth image, wherein a comparison of the image information captured during the fourth image and the fifth image identifies lens focal positions to be used as autofocus settings for varying distances from the imaging system to objects in the subsequent image scene.

5. An imaging method comprising:
    capturing, by an image sensor, image data comprising a first and a second image while changing a lens focal position of a lens during an exposure of the first and second images, the lens focal position of the lens being changed with a first speed profile for the first image and a second speed profile for the second image, wherein the first and second speed profiles are asymmetric and associated with non-constant acceleration;
    obtaining a distance map of a scene from at least the first and second images;
    analyzing the obtained distance map to identify first regions of the scene that are in focus and second regions of the scene that are out of focus;
    constructing a point spread function based at least on analyzing the obtained distance map;
    capturing a third image during a single image frame exposure of the image sensor by activating one or more of a plurality of shutters of the image sensor based on the distance map, the third image being captured subsequent to the first and second images; and
    deconvolving the third image using the constructed point spread function to obtain an in-focus image.

6. The imaging method of claim 5, wherein:
    the first image is captured as the lens is moved within a defined first focal sweep, wherein the defined first focal sweep utilizes the first speed profile; and
    the second image is captured as the lens is moved within a defined second focal sweep, wherein the defined second focal sweep utilizes the second speed profile, the defined second focal sweep including a same range of lens focal positions as the defined first focal sweep.

7. The imaging method of claim 5, further comprising generating a stereoscopic image by combining distance map information with the in-focus image.

8. The imaging method of claim 5, further comprising:
    storing a lens focal position associated with a distance from the lens to an object in the scene corresponding to an identified sharpest focus depth position as an autofocus setting; and
    in a subsequent image capture, using the stored autofocus setting to capture a second scene of an object at a same distance from the lens to an object in the scene.

9. The imaging method of claim 5, further comprising synchronizing activation of the plurality of shutters with movement of the lens.

10. A non-transitory computer readable medium storing instructions executable by a processor, the instructions comprising:
    instructions to capture image data of a scene by an image sensor during an exposure of a first image as a lens focal position of a lens is being changed with a first speed profile;
    instructions to capture image data of the scene during an exposure of a second image as the lens focal position of the lens is being changed with a second speed profile, wherein the first and second speed profiles are asymmetric and associated with non-constant acceleration;
    instructions to obtain a distance map of the scene from at least the first and second images;
    instructions to analyze the obtained distance map to identify first regions of the scene that are in focus and second regions of the scene that are out of focus;
    instructions to construct a point spread function based at least on analyzing the obtained distance map;
    instructions to capture a third image during a single image frame exposure of the image sensor by activating one or more of a plurality of shutters of the image sensor based on the distance map, the third image being captured subsequent to the first and second images; and
    instructions to deconvolve, using the constructed point spread function, the third image to obtain an in-focus image.

11. The computer readable medium of claim 10, the instructions further comprising:
    instructions to store a lens focal position associated with a distance from the lens to an object in the scene corresponding to an identified sharpest focus depth position as an autofocus setting; and
    instructions to utilize, in a subsequent image capture, the stored autofocus setting to capture a second scene of an object at a same distance from the lens to an object in the scene.

12. The computer readable medium of claim 10, the instructions further comprising instructions to identify depth positions of pixels at respective sharpest lens focal positions, wherein the obtained distance map is based at least in part on the identified depth positions of the pixels.

13. The computer readable medium of claim 10, the instructions further comprising instructions to synchronize activation of the plurality of shutters with movement of the lens.

14. The imaging system of claim 1, wherein the at least one hardware processing circuit is further configured to synchronize activation of the plurality of shutters with movement of the imaging lens.

15. The imaging system of claim 1, wherein:
    the imaging sensor is configured to capture the first image when the imaging lens is moved within a defined first focal sweep, wherein the defined first focal sweep utilizes the first speed profile;
    the imaging sensor is configured to capture the second image when the imaging lens is moved within a defined second focal sweep, wherein the defined second focal sweep utilizes the second speed profile, the defined second focal sweep including a same range of lens focal positions as the defined first focal sweep; and
    the at least one hardware processing circuit is configured to compare the first image and the second image to identify sharpest focus depth positions of pixels in the range of the lens focal positions, wherein the obtained distance map is based at least in part on the sharpest focus depth positions of the pixels.

16. The imaging system of claim 1, wherein the at least one hardware processing circuit is further configured to generate a stereoscopic image by combining the distance map information with the in-focus image.

17. The imaging method of claim 5, further comprising:
    comparing the first image and the second image to identify sharpest focus depth positions of pixels in a range of the lens focal positions for the scene, wherein the obtained distance map is based at least in part on the sharpest focus depth positions of the pixels.

18. The imaging method of claim 17, wherein the sharpest depth positions of the pixels are identified based at least on evaluating content of the scene.

19. The computer readable medium of claim 10, the instructions further comprising instructions to compare the first image and the second image to identify sharpest focus depth positions of pixels in a range of the lens focal positions, wherein the obtained distance map is based at least in part on the sharpest focus depth positions of the pixels.

20. The computer readable medium of claim 10, the instructions further comprising instructions to generate a stereoscopic image by combining distance map information with the in-focus image.

\* \* \* \* \*